(12) United States Patent
Christie, IV

(10) Patent No.: US 6,430,176 B1
(45) Date of Patent: Aug. 6, 2002

(54) MULTIMEDIA CHANNEL MANAGEMENT THROUGH PSTN SIGNALING

(75) Inventor: Samuel Henry Christie, IV, Cary, NC (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/187,975

(22) Filed: Nov. 6, 1998

(51) Int. Cl.[7] .......................... H04L 12/50; H04L 12/52
(52) U.S. Cl. ...................... 370/355; 370/261; 370/352; 370/389; 379/93.01; 379/900; 379/901; 379/908
(58) Field of Search .................. 370/261, 351, 370/352, 353, 354, 355, 356, 357, 389; 379/93.01, 93.09, 93.11, 93.14, 93.15, 202, 231, 234, 900, 901, 908

(56) References Cited

U.S. PATENT DOCUMENTS

| | | | | |
|---|---|---|---|---|
| 5,410,343 A | * | 4/1995 | Coddington et al. ............ | 348/7 |
| 5,604,737 A | | 2/1997 | Iwami et al. ................ | 370/352 |
| 5,689,553 A | * | 11/1997 | Ahuja et al. ................. | 379/202 |
| 5,916,302 A | * | 6/1999 | Dunn et al. ................. | 709/204 |
| 5,917,817 A | * | 6/1999 | Dunn et al. ................. | 370/352 |
| 6,028,917 A | * | 2/2000 | Creamer et al. ........ | 379/100.01 |
| 6,046,762 A | * | 4/2000 | Sonesh et al. ................. | 348/16 |
| 6,125,126 A | * | 9/2000 | Hallenstal .................... | 370/522 |
| 6,128,304 A | * | 10/2000 | Gardell et al. ............... | 370/401 |
| 6,141,341 A | * | 10/2000 | Jones et al. .................. | 370/352 |
| 6,157,950 A | * | 12/2000 | Krishnan ..................... | 709/223 |
| 6,161,134 A | * | 12/2000 | Wang et al. ................. | 709/220 |
| 6,167,043 A | * | 12/2000 | Frantz .......................... | 370/356 |
| 6,175,622 B1 | * | 1/2001 | Chiniwala et al. .......... | 379/211 |
| 6,205,135 B1 | * | 3/2001 | Chinni et al. ................ | 370/356 |
| 6,222,826 B1 | * | 4/2001 | Faynberg et al. ........... | 370/252 |
| 6,240,449 B1 | * | 5/2001 | Nadeau ....................... | 709/223 |
| 6,256,389 B1 | * | 7/2001 | Dalrymple et al. .......... | 379/900 |
| 6,272,127 B1 | * | 8/2001 | Golden et al. ............... | 370/352 |
| 6,278,704 B1 | * | 8/2001 | Creamer et al. ............. | 370/352 |

FOREIGN PATENT DOCUMENTS

| | | | |
|---|---|---|---|
| EP | 0 841 831 A | 5/1998 | ........... H04Q/11/04 |
| WO | WO 98/41032 | 9/1998 | |
| WO | WO 98/44703 | 10/1998 | ............ H04M/3/22 |

OTHER PUBLICATIONS

Handley, Schulzrinne, and Schooler. SIP: Session Initiation Protocol. Internet Engineering Task Force Internet Draft. Nov. 11, 1997. pp. 1–69.*
M. Sherif, F. Burgi, A. Schiano, and K. Tewani. Multiple Call Establishment for Multimedia Services on the PSTN. 1997 IEEE. pp. 407–410.*
M. Sherif. Multimedia Networks and the Public Switched Telephone Network. IEEE Communications Magazine. Jan. 1996. pp. 92–94.*
H. Schulzrinne. A comprehensive multimedia control architecture for the Internet. Technical Report. Dept. of Computer Science, Columbia University. 1997. pp. 1–12.*
European Search Report dated Apr. 25, 2000.
Thom, Gary A., "H.323: The Multimedia Communications Standard For Local Area Networks," IEEE Communications Magazine, Dec. 1996, pp. 52–56.

* cited by examiner

Primary Examiner—Hassan Kizou
Assistant Examiner—Joe Logsdon
(74) Attorney, Agent, or Firm—Withrow & Terranova, P.L.L.C.

(57) ABSTRACT

A method and apparatus establishes through the public switch telephone network, a multimedia communications session between first and second telecommunications infrastructure. Each infrastructure is located on a separate private data network and comprises logic to automatically establish an integrated voice and data session initiated by a single telephone call from one infrastructure to the other.

40 Claims, 12 Drawing Sheets

MULTIMEDIA CHANNEL MANAGEMENT THROUGH PSTN SIGNALING

BACKGROUND OF THE INVENTION

1. Field of the Invention

The present invention is related to the field of telecommunications infrastructures that use Public Switched Telephone Network (PSTN) call management and a public data network to establish simultaneous voice and data (multimedia) communications between such telecommunications infrastructures. In particular, this invention relates to a way by which a telecommunications infrastructure uses a single telephone directory number to call another telecommunications infrastructure located on a different communication network to establish multimedia communications therebetween.

2. Description of the Problem Solved

Traditional telephone systems use an analog telephone to transmit voice over telephone lines. If a telephone user has only one telephone line, the user cannot perform two telecommunications tasks simultaneously. Typically, if a user wishes to initiate a voice communication and a data connection, the user must use separate PSTN telephone lines for each. This means that a user must pay additional monthly charges for the extra line. In view of the wide commercial and private use of the Internet, it is desirable to merge voice and data into an integrated communications session, i.e., where two users communicate via voice and data over one line. There are data communications systems that include voice capability, for example, where the voice communications path is sent to a user through the user's personal computer.

Such a system, however, makes use of some type of voice-data conversion, such as voice-over-Internet-protocol, resulting in lower quality voice communications than is typical of the PSTN. Additionally, most multimedia telecommunications systems do not permit close integration of desktop applications such as office suites, presentation software, word processing software and the like. One exception is Microsoft Net meeting JM software, which integrates voice and data telecommunications. However, because of the voice-data conversion, the quality of the voice communications is poor.

Computer software products, such as marketed by the assignee of the present application under the mark Voice Button™, allow a PSTN call to be initiated from a computer user interface, however, the call is not closely integrated with any sort of data communications system and does not allow application sharing. Additionally, such a call cannot be initiated from within desktop computer application suites. A description of a way a phone call can be initiated from a computer desktop can be found in U.S. Pat. No. 6,337,858 and is assigned to the same assignee as this application and is herein incorporated by reference.

A typical telephone call is initiated manually by voice contact and the data communication takes place via H.323 or a T.120 compliant data agent such as a TCP/IP network, e.g., the Internet. Thus, using known technology, to establish a multimedia telecommunications session, a calling user must know the telephone number and the computer address, IP address or Domain Name System (DNS) name of the called user. The calling user must also initiate the telephone call and data connection separately. However, it is now possible to establish a voice connection initiated over the PSTN and a data connection via a TCP/IP network between telecommunications infrastructures located within a single "private communication" (a network having private address spaces and restricted interconnectivity) such as a corporate intranet as described in U.S. Pat. No. 6,256,389 (Collaboration System), which is assigned to the same assignee as this application and is incorporated herein by reference. A "telecommunications infrastructure" is defined for the purposes of this disclosure as a user's telephone and computer typically sitting on the user's "computer desktop." A telecommunications infrastructure can also include a private branch exchange (PBX), computer telephony integration (CTI) server, as well as other communications devices and systems known in the art.

As described in the Collaboration System application, a user of a telecommunications infrastructure need only initiate one call to establish a PSTN voice and an associated data connection with another telecommunications infrastructure. However, the Collaboration System requires that the calling user have local access to the IP address of the called user's computer. The Collaboration System can establish only a multimedia communication between two "telecommunications infrastructures" located within the same private network, such as a corporate intranet, and cannot establish such a multimedia communication initiated by a single telephone call through the PSTN between two separate private networks.

One known telecommunications technology that can transmit both voice and data communications in digital form is the Integrated Services Digital Network (ISDN). For ISDN to be applied between two systems, both must comply with the standard H.320, a well known telecommunications platform standard of the International Telecommunications Union (ITU), which defines the interoperability between video and voice for video conferencing over ISDN. However, the ISDN is not widely employed, requires special terminals, and is expensive. The present invention recognizes that it would be highly desirable for customers located on different private networks, which have not paid the high service charges to access ISDN, to be able to use the PSTN to inexpensively establish an integrated voice and data (multimedia) communications session therebetween.

Thus, what is needed is a way to automatically establish an integrated data and high-quality PSTN voice communication session between a traditional analog telephony loop telecommunications infrastructure of one private network and another telecommunications infrastructure located on another private network.

Thus, an object of the present invention is to provide an apparatus and method that allows a customer without ISDN capability to establish an integrated data and high-quality PSTN voice communication between it and another telecommunications infrastructure existing on a separate private network.

Another object of the present invention is to eliminate the need to use an ISDN to establish an integrated high quality voice and data communication session.

It is a further object of the present invention to provide an apparatus comprising telecommunications infrastructures existing on separate communication networks (hereinafter referred to as "private networks"), including computer software of the invention residing therein to utilize standard ITU protocols to automatically and simultaneously establish a voice connection over the PSTN and a data connection via a public data network and a method for establishing such voice and data connections.

It is a further object of the present invention to provide an apparatus comprising telecommunications infrastructures existing on separate private networks to automatically transfer over the PSTN the respective computer addresses of each telecommunications infrastructure computer to the other utilizing standard ITU protocols, and a method for transferring such computer addresses over the PSTN.

It is also an object of the invention to provide a method and apparatus whereby a user of a first telecommunications infrastructure can establish a multimedia connection with a second telecommunications infrastructure located on a separate private communications network, without the first telecommunications infrastructure knowing or having local access to the computer address of the second telecommunications infrastructure computer.

SUMMARY OF THE INVENTION

The present invention enhances overall human telecommunications by providing voice with data and application sharing communication between non-ISDN customers located on different private networks, such as corporate intranets.

With the present invention, a customer or user, with no knowledge or local access to the called user's computer address, need only initiate one telephone call to establish a PSTN voice session originating through the PSTN, and an associated data session established over a public data network connection. According to the present invention, a calling user makes a standard telephone call (using a single directory number) to a called user located on a separate private network. If both parties happen to have H.323 or T.120 capability and the software of the invention, then they will be offered the multi-media session. The environment that the present invention typically operates in is a network which includes telecommunications infrastructures connected to a PSTN, and a public data network which has a service provider point of presence for providing the public data network connection to each infrastructure. Each telecommunications infrastructure may have a computer telephony server and in such event, each server would be connected to the PSTN and the public data network.

The present invention may be implemented using a PBX, which is a telecommunications switch at a user's premises that handles call management. A PBX is typically used by larger organizations. The invention operates to allow a user of a first infrastructure (referred to hereinafter as User1) to set up a multimedia connection with a user of a second infrastructure (referred to hereinafter as User2) located in a separate private network by making a telephone call to User2 through the PSTN. According to the present invention, upon User1 making a telephone call to User2, and establishing a traditional voice session between traditional telephony loops, an end-serving switch (PBX or central office) will signal through the PSTN to User2 located on a private network the address of User1's computer via an initial message (INM) signal. In response thereto, end-serving switch associated with User2 will insert User2's computer address in an address completed message (ACM) or answer message (ANM) and transfer the ACM or ANM end-serving switch of User1. User1 initiates connect messages to User1's computer, whereupon data and voice connections between the two separate private networks are established. In other words, when User1 uses a telecommunications infrastructure of the present invention to make a telephone call to User2, the apparatus and method of the present invention serve to automatically and simultaneously establish both a voice and data connection therebetween.

The software, which implements many aspects of the present invention, can be stored on a medium. The medium can be magnetic such as in the form of a diskette, tape or fixed disk, or optical such as a CD-ROM. Alternatively, the software can be supplied via the Internet or some type of private data network.

DETAILED DESCRIPTION OF PREFERRED EMBODIMENTS OF THE PRESENT INVENTION

Throughout the following discussion, I refer to the calling user as "User1" and the called user as "User2." When I refer to a computer, I am referring to a computer, which can sit on a desktop such as a personal computer. Although, such a system can sit on a desktop, it can also be a mobile or laptop computer, and such terminology is not meant to limit the operating environment of the invention.

When I refer to a computer desktop, I am referring to the "desktop" interface of a graphical user interface based operating system. When I refer to a H.323 terminal device, I am referring to a computer or a special purpose device such as an IP telephone that has the capability to establish a telephone call. When I refer to a data agent I am referring to a computer or H.323 terminal device. When I refer to a computer address, I am referring to an IP address, a DNS name, T.120 address, H.323 connect parameters, H.245 fast connect parameters, H.225 connect parameters, HTML web browser address or any other commonly known data address or connect parameters. In the preferred embodiment, the International Telecommunication Union (ITU) H.323 platform and its related series of specifications such as H.225, H.245 and T.120 are used. The H.323 platform and related series of specifications are well known in the art. More information about the H.323 platform may be found in the publications entitled "ITU-T Recommendation H.323 (November, 1996)", "ITU-T Recommendation H.245 (March 1996)", and "ITU-T Recommendation H.225 (November 1996)." All of these publications are incorporated herein by reference.

Figure 1:
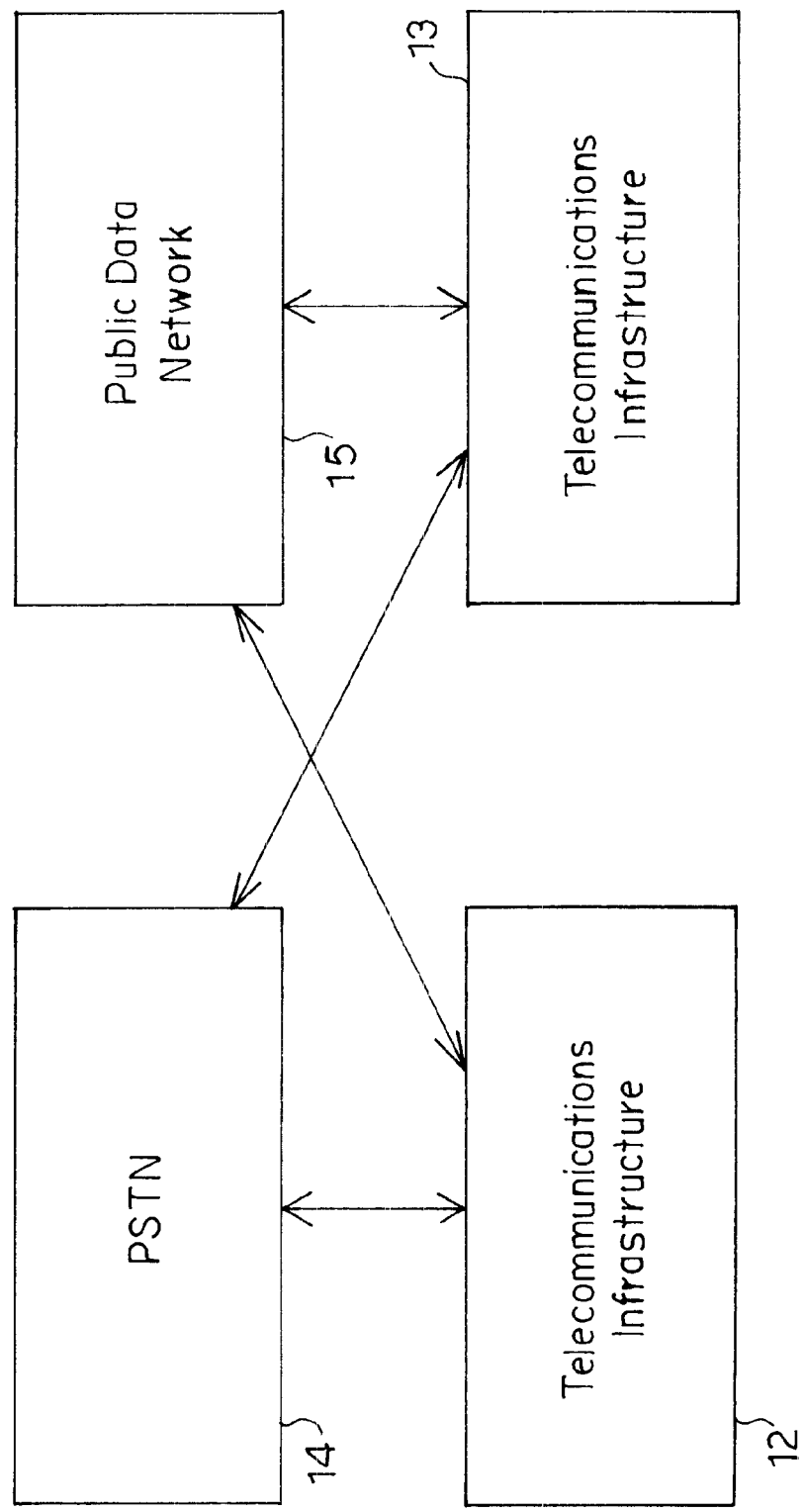
FIG. 1 is a block diagram of the general telecommunications network environment of the present invention.

FIG. 1 illustrates the general network environment of the apparatus and method of the present invention. The network includes two telecommunications infrastructures 12 and 13 that interconnect to a PSTN 14 and a public data network 15. The public data network 15 and PSTN 14 interconnect telecommunications infrastructures 12 and 13 and provide telecommunications infrastructures 12 and 13 a communications connection. A single telephone call initiated by one of the telecommunications infrastructures 12 or 13 to the other establishes integrated high quality voice and data communication sessions as described in more detail below.

Figure 2:
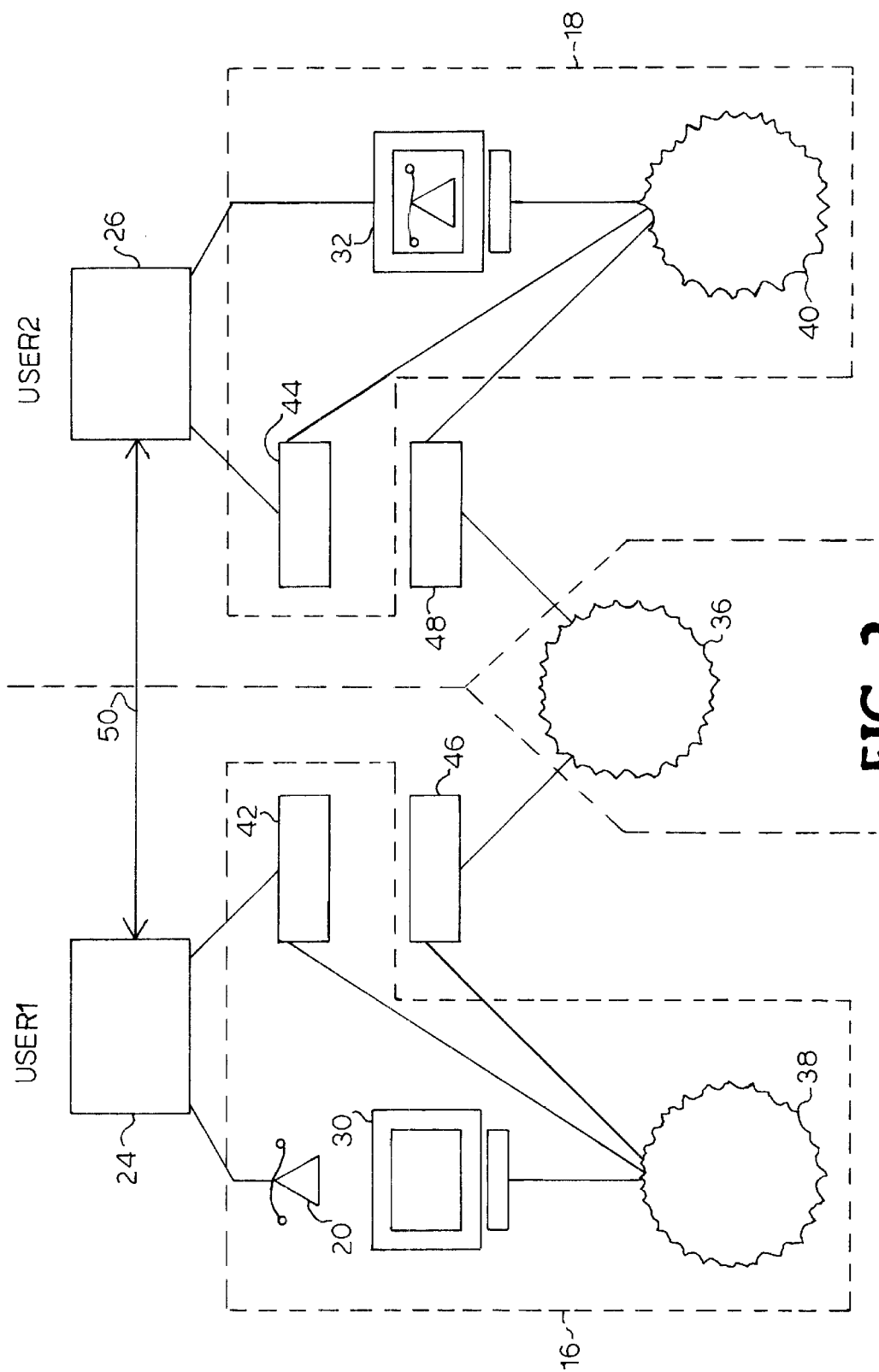
FIG. 2 is a diagram of a telecommunications network environment in accordance with a first embodiment of the present invention.

FIG. 2 shows a diagram of a telecommunications network configured according to the first embodiment of the invention. In reference to User1, telephone 20 is interfaced directly to central office (CO) 24 via a wire connection. Computer 30 is interfaced to the public data network 36 through an Ethernet connection between computer 30 and corporate Intranet 38. Telephone 20 and computer 30 are assumed to be on User1's desk and to be User1's "telecommunications infrastructure." User1 telephone voice communication control is handled using computer telephony integration (CTI) via CTI server 42. CTI server 42 is connected to CO 24 and LAN 38. Internet service provider (ISP) 46 is connected to public data network 36 and LAN 38. Illustrative according to the first embodiment of the invention, the public data network 36 is the Internet.

Still referring to FIG. 2, User2 employs an H.323 terminal device 32 connected to CO 26 and public data network 36 via corporate Intranet 40. Voice-over-internet-protocol (VOIP) Gateway 44 is connected to CO 26 and LAN 40 via frame relay, over T1, T3 or Ethernet, etc. ISP 48 is connected to LAN 40 and to public data network 36. CO 24 and 26 are connected through the PSTN via trunks 50.

Gateway 44 transfers User2 voice data. In summary, VOIP Gateway 44 operates, in part, to launch voice calls over the Internet, initiating a Plain Old Telephone Services (POTS) call through the PSTN using dialed dual tone multi-frequency (DTMF), or utilizing the primary rate interface (PRI) trunk technology, all being well known in the art. The servers may be "stand-alone" servers, telephony application programming interface (TAPI) enabled phone devices which support similar requests and notifications, or a PSTN switch with built-in server capability.

Figure 3:
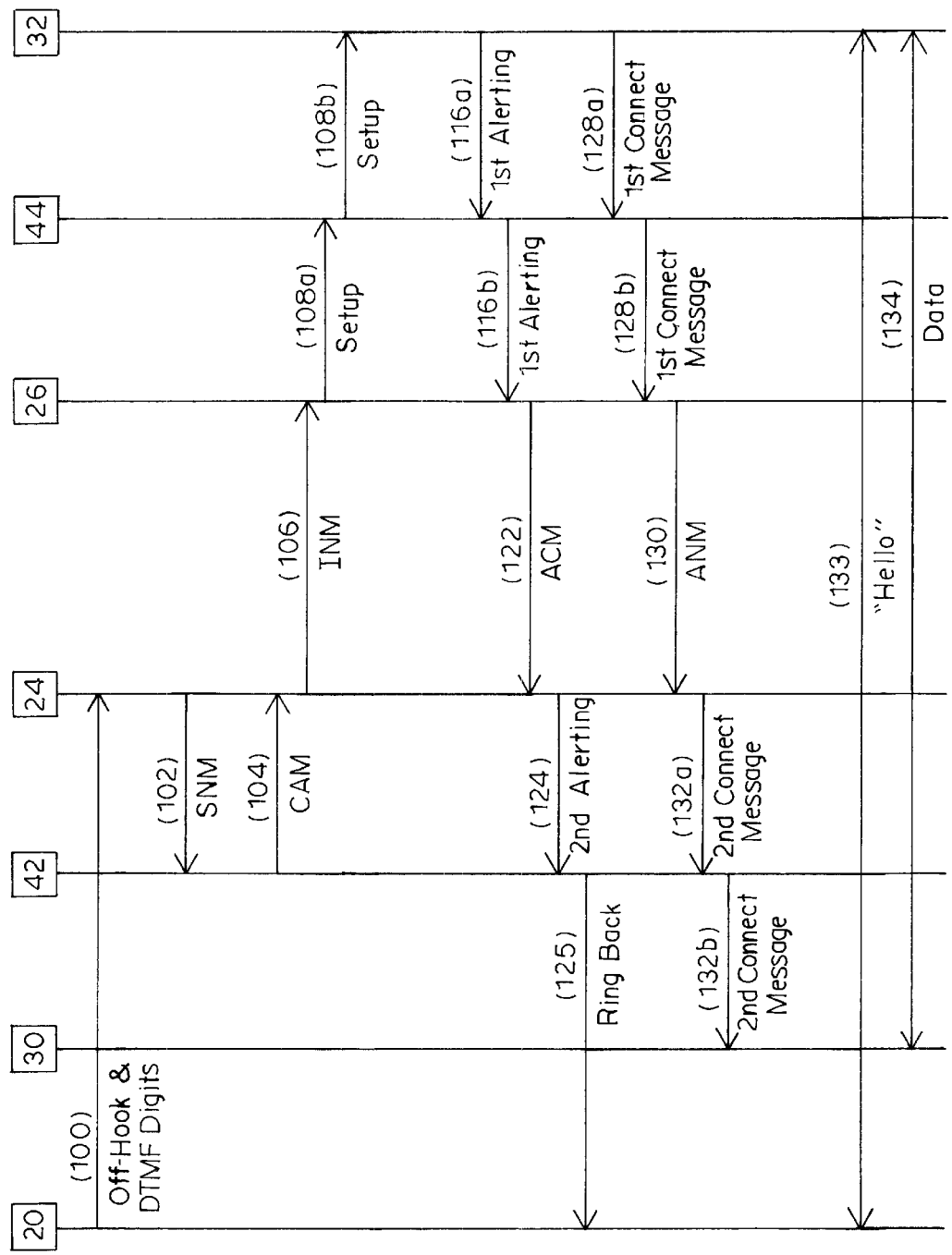
FIG. 3 is a call flow diagram of the first embodiment, showing how the multimedia voice and data sessions are made through a PSTN.

FIG. 3 illustrates the sequence of messages sent between User1 and User2, based on the first embodiment, during the establishment of the multimedia communication sessions. User1 notifies CO 24 that User1 wishes to make a telephone call to User2. This typically is done simply by User1 picking up the receiver end of telephone 20 and dialing the telephone number of User2's H.323 terminal device 32, which automatically sends an off-hook message and DTMF digits 100 to CO 24. Upon receiving off-hook message 100, CO 24 immediately notifies CTI server 42 by transmitting a "server-notify" message (SNM) 102 to CTI server 42 that User1 is placing a telephone call to User2 H.323 terminal device 32. Through the use of the software of the present invention, CTI server 42 obtains from a lightweight directory access protocol (LDAP) directory lookup (not shown) the address of User1 computer 30. LDAP is a standard used in the Internet for directory queries. These directories can be public or private. It is also appreciated that the software can be developed to locate computer 30 address by other means commonly known in the art. Computer address message (CAM) 104, which contains computer 30 address, is sent to CO 24. CAM 104, DTMF digits, and other information as known in the art are inserted by CTI server 42 into T1 server messages by standard CTI protocols. For example, this could be accomplished by using Meridian Link CTI protocols.

Referring still to FIG. 3, to convey the CAM 104 and DTMF digits across

PSTN 14 trunks (not shown) to CO 26, in a preferred embodiment, CO 24 packs the information it received from User1 off-hook message 100, including User1's computer address into an ISDN user part (ISUP). CO 24 will transmit to CO26 an initial message (INM) 106 containing the pertinent information of off-hook message 100, such as DTMF digits along with the address of computer 30.

An ISUP protocol is part of the Signaling System Number Seven (SS7) specification, which is commonly known in the art, and is a collection of switching protocols that allow call control signaling to work across different switches across the PSTN. The SS7 controls the bearer connections. ISUP protocol specifies the INM, ACM, and ANM messages that are sent back and forth between central offices to control PSTN 14 trunks (not shown). With ISUP protocol, the INM is usually referred to as an intial address message or IAM.

Signaling information for a D channel is received from SS7 messages. When the signaling information reaches the end-user's central office, the SS7 releases the relevant information into the D channel messages, which are then sent to the terminal equipment. Still referring to FIG. 3, after the signal information contained in INM 106 arrives at CO 26, the relevant information of User1 is transferred from the INM 106 to setup message 108a. Setup message 108a is sent to User2's Gateway 44, which in turn transmits a setup message 108b to H.323 terminal device 32. Setup messages 108a and 108b are also collectively referred to herein as set up message 108. However, in contrast to conventional practice, User1 's computer address corresponding to an address location on a private network distinct from the network of User2 is transmitted with the setup message 108 from CO 26 to Gateway 44 and then to H.323 terminal device. At this point, User2's telecommunications infrastructure has obtained User1's computer address over the PSTN 14 via by User1 initiating a single telephone call to User2.

In response to receiving setup message 108b, User2 H.323 terminal device 32 alerts User2 to the incoming call by ringing, flashing a light, or by some other method known in the art but not illustrated.

Still referring to FIG. 3, H.323 terminal device 32 sends first alerting messages 116a and 116b to User2 CO 26, through Gateway 44. First alerting messages 116a and 116b are also collectively referred to herein as first alerting message 116. At CO 26, the relevant information contained in alerting message 116 is inserted into another ISUP message called the address complete message (ACM) 122 which is transmitted across PSTN 14 (not shown) to CO 24. CO 24 then transmits a second alerting message 124 to CTI server 42. CTI server 42 transmits a ring back message 125 to User1 telephone 20. User1 may have selected a service that provides User1 with a ringing sound to alert User1 that User2 H.323 terminal device 32 is ringing. Moreover, User1 computer 30 may visually display information to User1 to indicate that the data media connection is proceeding.

Once User2 accepts User1's telephone call via H.323 terminal device 32, first connect messages 128a and 128b are sent to CO 26 via Gateway 44. First connect messages 128a and 128b are also collectively referred to herein as first connect message 128. CO 26 removes the relevant information from connect message 128 and inserts the information in an answer message (ANM) 130. Before ANM 130 is sent across the PSTN (not shown) to CO 24, H.323 terminal device 32 or Gateway 44, inserts the computer address of H.323 terminal device 32 of User2 into connect message 128. CO 26 then packs the IP address of H.323 terminal device 32 and relevant information into ANM 130 which is then transmitted across the PSTN 14 (not shown) to CO 24. It is also possible for CO 26 to hold the IP address of H.323 terminal device 32 locally for packing into ANM 130.

Once CO 24 receives ANM 130, it transfers the information contained in ANM 130 to second connect messages 132a and 132b to CTI server 42 and computer 30, respectively. Second connect messages 132a and 132b are also collectively referred to herein as second connect message 132. The CTI connect message 132 includes User2's computer address. At this point the telecommunications infrastructures of each private network are able to setup the data transmission therebetween. Thus, a high quality PSTN voice session 133 and a data session 134 between User1 and User2 telecommunications infrastructures are established, even without the telecommunications infrastructures employing ISDN technology.

Figure 4:
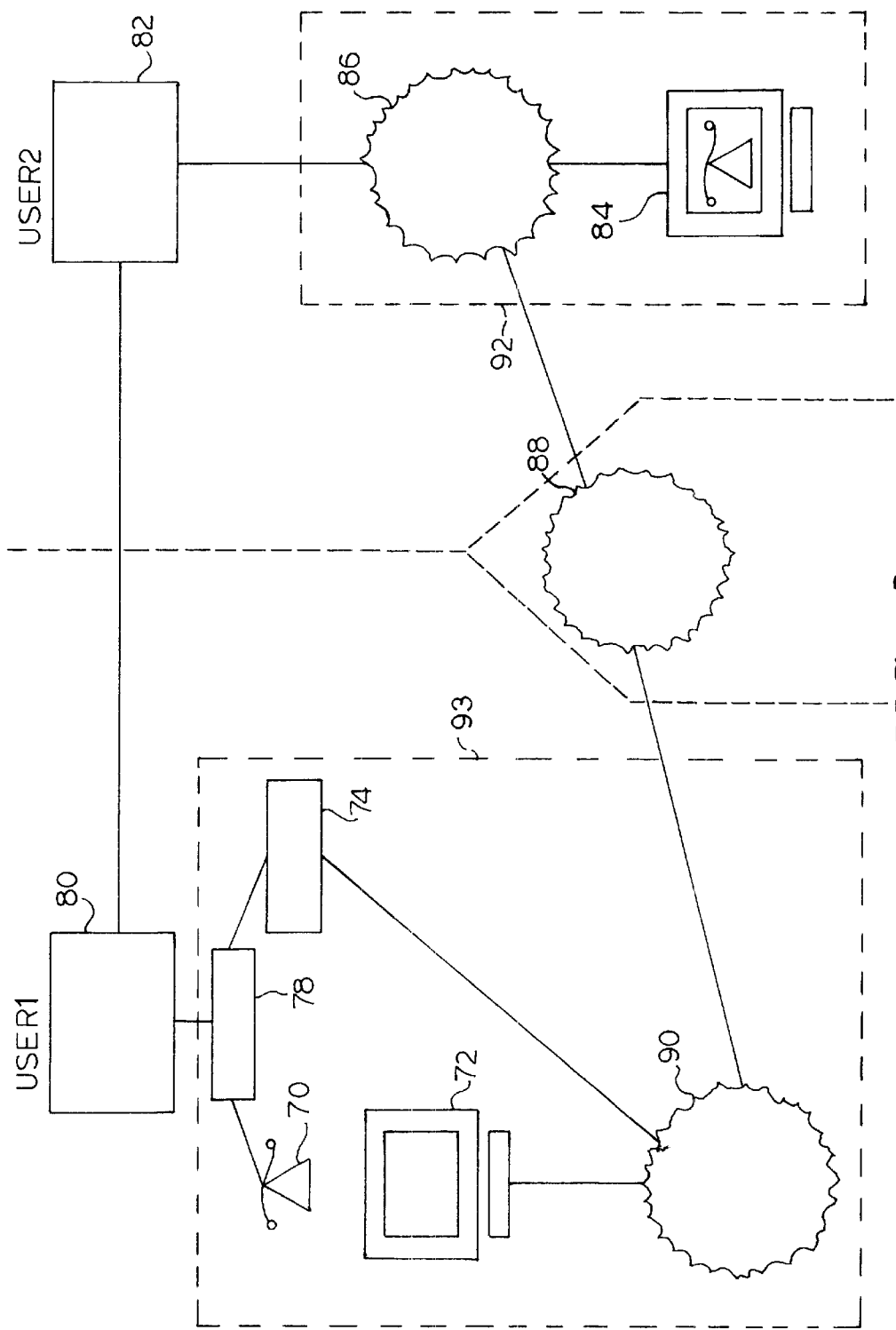
FIG. 4 is a diagram of a telecommunications network environment in accordance with a second embodiment of the invention.

FIG. 4 shows a second embodiment of the invention operating within different telecommunications infrastructure configurations as well as with different end serving switch technology. According to the second embodiment, User1 telephone 70 is interfaced to a private branch exchange (PBX) 78, rather than directly to CO 80 as is illustrated in the first embodiment (FIG. 2). Computer 72 is interfaced to the public data network 88 through an Ethernet connection between computer 72 and private Intranet 90. User 1's telephone voice communication control is handled using CTI server 74. CTI server 74 is connected to PBX 78 and private Intranet 90. Telephone 70, computer 72, PBX 78, CTI server 74, and private Intranet 90 may be considered as being User1's telecommunications infrastructure 93. PBX 78 could be a Meridian manufactured by Nortel, using Meridian Link CTI protocols to link with CTI server 74. It is appreciated that telecommunications infrastructures may also be configured such that telephone 70 and CTI server 74 are directly connected to CO 80. It is further appreciated that if CO 80 is a DMS, the invention could use Compucal CTI protocol to form the communication link between CO 80 and CTI server 74. In the event that the invention is deployed using the techniques of the advanced intelligent network (AIN), the server is a service control point (SCP) and the protocol is TCAP over ISUP.

Still referring to FIG. 4, User2's telecommunications infrastructure 92 includes H.323 terminal device 84, which is connected to private Intranet 86. Private Intranet 86 is also connected to CO 82 and public data network 88. Computer 72 and H.323 terminal device 84 are also connected to Internet Service Providers (ISP) (not shown), as commonly known in the art, and which can also be considered to be part of the users' telecommunications infrastructures.

As illustrated in FIG. 4, the invention operates across different user configurations. For example, corporations may include a telecommunications infrastructure with a PBX similar to that of User1. Households, however, will not use a PBX and will generally utilize a telecommunications infrastructure similar to that of User2. By way of additional example, it is appreciated that both telecommunications infrastructures could be configured like User1 or User2.

Figure 5:
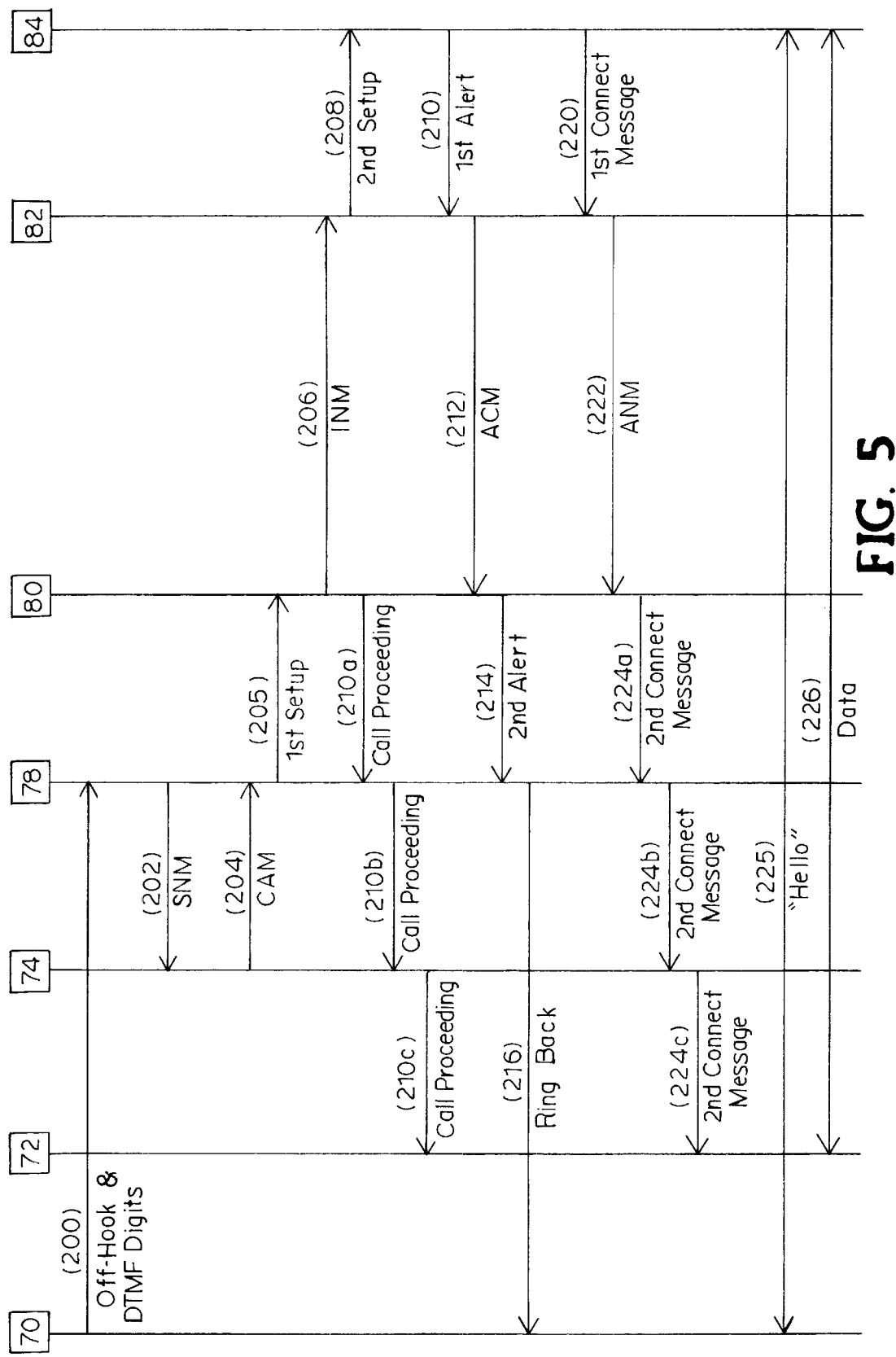
FIG. 5 is a call flow diagram of the second embodiment, showing how the multimedia voice and data sessions are made through a PSTN via a private branch exchange.

FIG. 5 illustrates the sequence of messages sent between User1 to User2 during the establishment of a multimedia communication session in accordance with the second embodiment. In FIG. 5, User1 notifies PBX 78 that User1 wishes to make a telephone call to User2. Again, this is typically done by User1 picking up the receiver end of User1's telephone and dialing User2's telephone number. This generates an off-hook message 200 transmission to PBX 78. The off-hook message 200 is followed by the signaling information of User2's telephone number. Upon receiving the dialed digits, PBX 78 notifies CTI server 74 that User1 is placing a telephone call to User2's H.323 terminal device 84 by transferring a server-notify message (SNM) 202 to CTI server 74. Utilizing the software of the invention (FIGS. 6A–E), CTI server 74 obtains the computer address of User1 computer 72 from a LDAP directory look up. CTI server 74 then sends a computer address message (CAM) 204 to PBX 78, which contains the User1's computer address. PBX 78 will transmit User1's computer address to CO 80, by inserting the computer address, and other pertinent signaling information into first setup message 205. To convey this information across PSTN trunks (not shown) to CO 82, CO 80 packs first setup message 205 information, including User1's computer address into initial message (INM) 206. INM 206 is transferred to CO 82. Still referring to FIG. 5, once INM 206 arrives at CO 82, User1 computer address and other information contained in INM 206 is removed from INM 206 and inserted into second setup message 208. Second setup message 208 is transmitted to User2's H.323 terminal device 84. At this point, User2's telecommunications infrastructure has obtained User1's computer address automatically via INM 206 being sent over a PSTN (not shown). User2 H.323 terminal device 84 alerts User2 to the incoming call by simulating a telephone ring, flashing an icon on the screen, or by some other method. Meanwhile, back at User1's end of the connection, CO 80 transmits call proceeding messages 210a, 210b and 210c back to PBX 78, CTI server 74, computer 72, respectively.

Referring still to FIG. 5, User2's computer 84 also sends a first alert signal to CO 82. CO 82 inserts the information contained in first alert signal 210 into an ACM 212, which is then transmitted across a PSTN (not shown) to CO 80. CO 80 generates and sends a second alert signal 214 to PBX 78, which generates a ringback signal 216 to telephone 70. When User2 answers the telephone call from User1, H.323 terminal device 84 generates and transmits first connect message 220 to CO 82. CO 82 receives the connect message 220 and generates an answer message (ANM) 222. Simultaneous therewith, CO 82 inserts the computer address of User2's computer into ANM 222, which is then transferred across a PSTN (not shown) to CO 80. Alternatively, H.323 terminal device 84 inserts its own computer address into the first connect message 220, which is then inserted by CO 82 into ANM 222.

Upon CO 80 receiving ANM 222, CO 80 generates a second connect message 224a. Second connect messages 224b and 224c transmit User2's computer address to computer 72. At this point, the telecommunications infrastructures of each private network now have the computer addresses of the other. A PSTN voice session 225 and a data session 226 between User1 and User2 has been automatically established. Alternatively, H.323 terminal device 84 computer address may be sent to User1 CO 80 via first alerting message 210 and ACM 212.

FIGS. 6A–6E illustrate the operation of the computer software for the second embodiment of the invention, as shown in FIG. 4. FIGS. 6A–6E, by way of example, is a typical program developed from the perspective of and for use with CO 82 (FIG. 4). FIGS. 6A–6E cover calls originating from User2 to User1 via H.323 terminal device 84 and from User1 to User2 via telephone 72, as shown in FIG. 4.

Figure 6A:
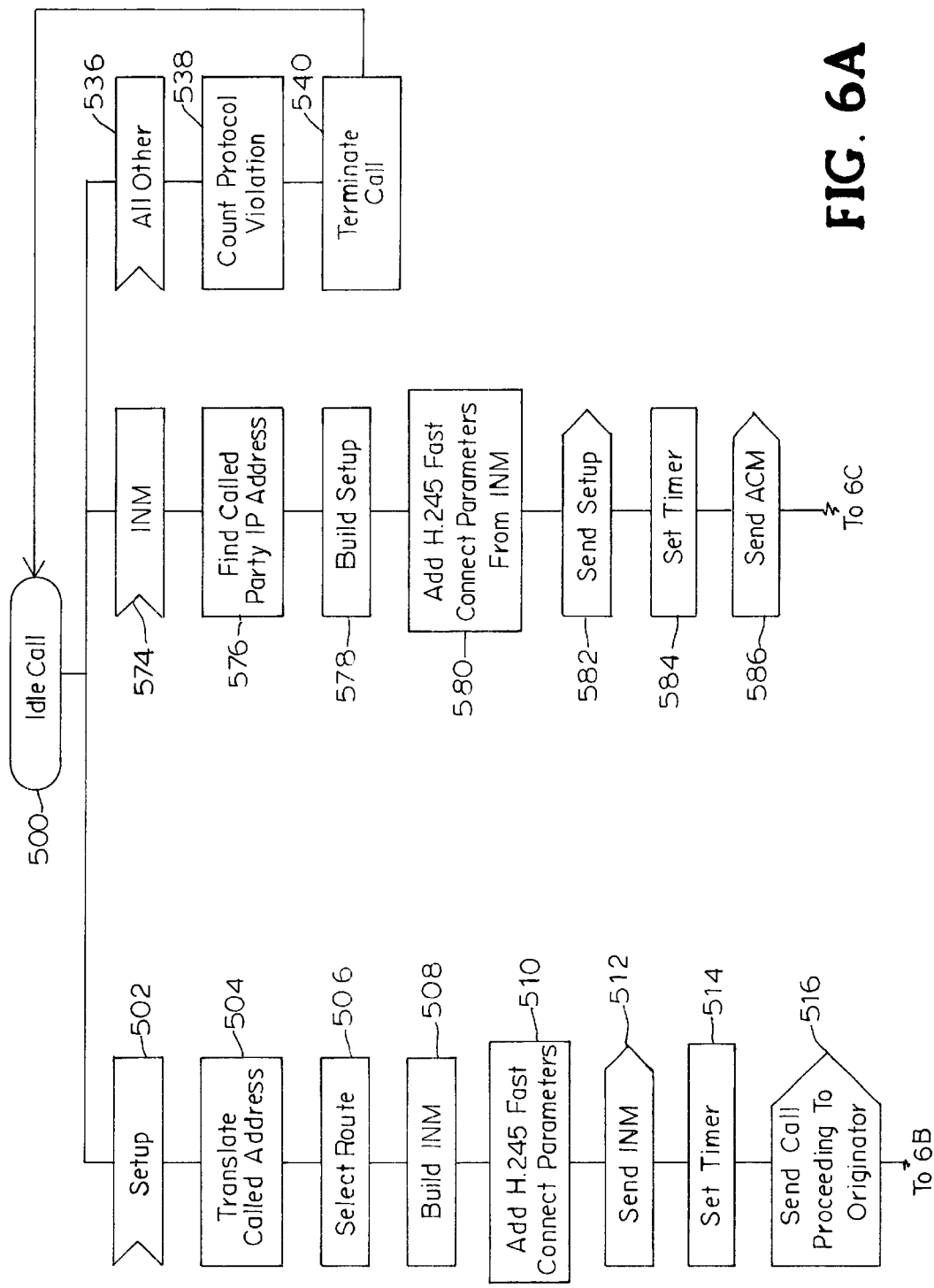
FIGS. 6A–6E are a functional flow diagram used to illustrate the computer software operations for implementing the second embodiment of the invention as shown in FIG. 4.
Figure 6B:
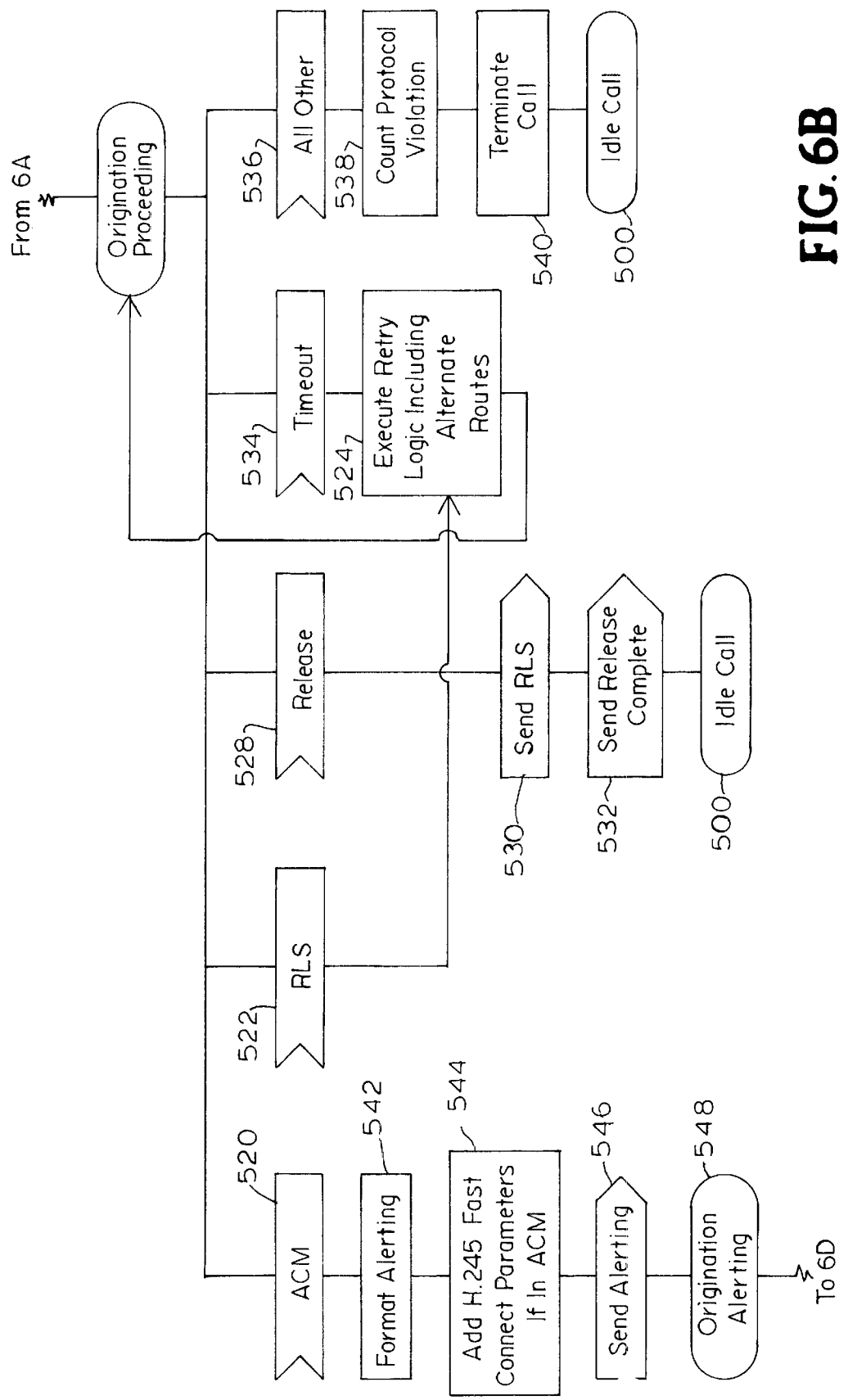

Referring specifically to FIG. 6A, User1 and User2 telecommunications infrastructures starts from an idle state 500 until either User1 or User2 initiates a call to the other party. Assuming User2 initiates a call to User1 via H.323 terminal device 84, H.323 terminal device 84 sends a setup message 502 to CO 82. CO 82 will translate the called address 504 and select a route 506 to transfer information to CO 80, which is essentially making a phone call to User1. CO 82 builds an initial message (INM) 508 and insert the H.245 fast connect parameters of H.323 terminal device 84 into the INM 510. CO 82 sends INM 512 to CO 80 and set the timer 514. A call proceeding message 516 is sent to H.323 terminal device 84 from CO 82 acknowledging to User2 that the call has proceeded to the origination proceeding stage 518 (FIG. 6B). At this stage of the phone call, a variety of responses are possible. On successful call attempts, CO 80 sends an address complete message (ACM) 520 to CO 82. This ACM may contain the H.245 fast connect parameters of computer 72. On unsuccessful scenarios, a RLS 522 is send to CO 82 from CO 80. RLS represents a release message in ISUP. The program will then try to execute retry logic 524 before returning to the origination proceeding stage 518. To terminate the call before it is completed, H.323 terminal device 84 sends a release 528 to CO 82, whereby CO 82 sends a release 530 to CO 80 and a release complete 532 to H.323 terminal device 84, whereby the program returns to an idle call state 500. Alternatively, the system could time out 534 if it takes too long to process the call and then proceed to execute retry 524 and return to the origination proceeding stage 518. In all other unsuccessful call attempts 536 the program will count the protocol violation 538 and terminate the call 540 to return to the idle state 500.

Figure 6C:
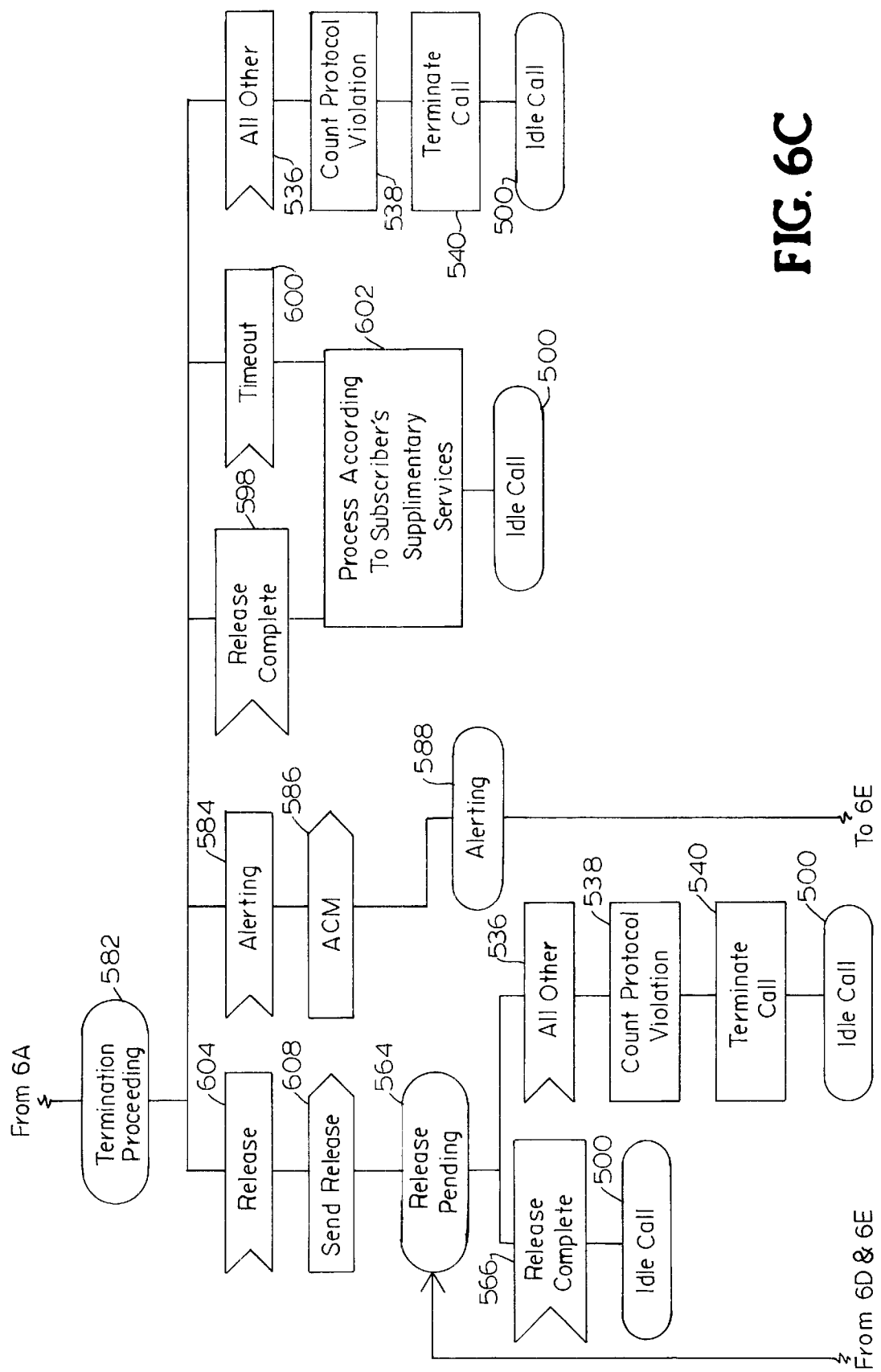
Figure 6D:
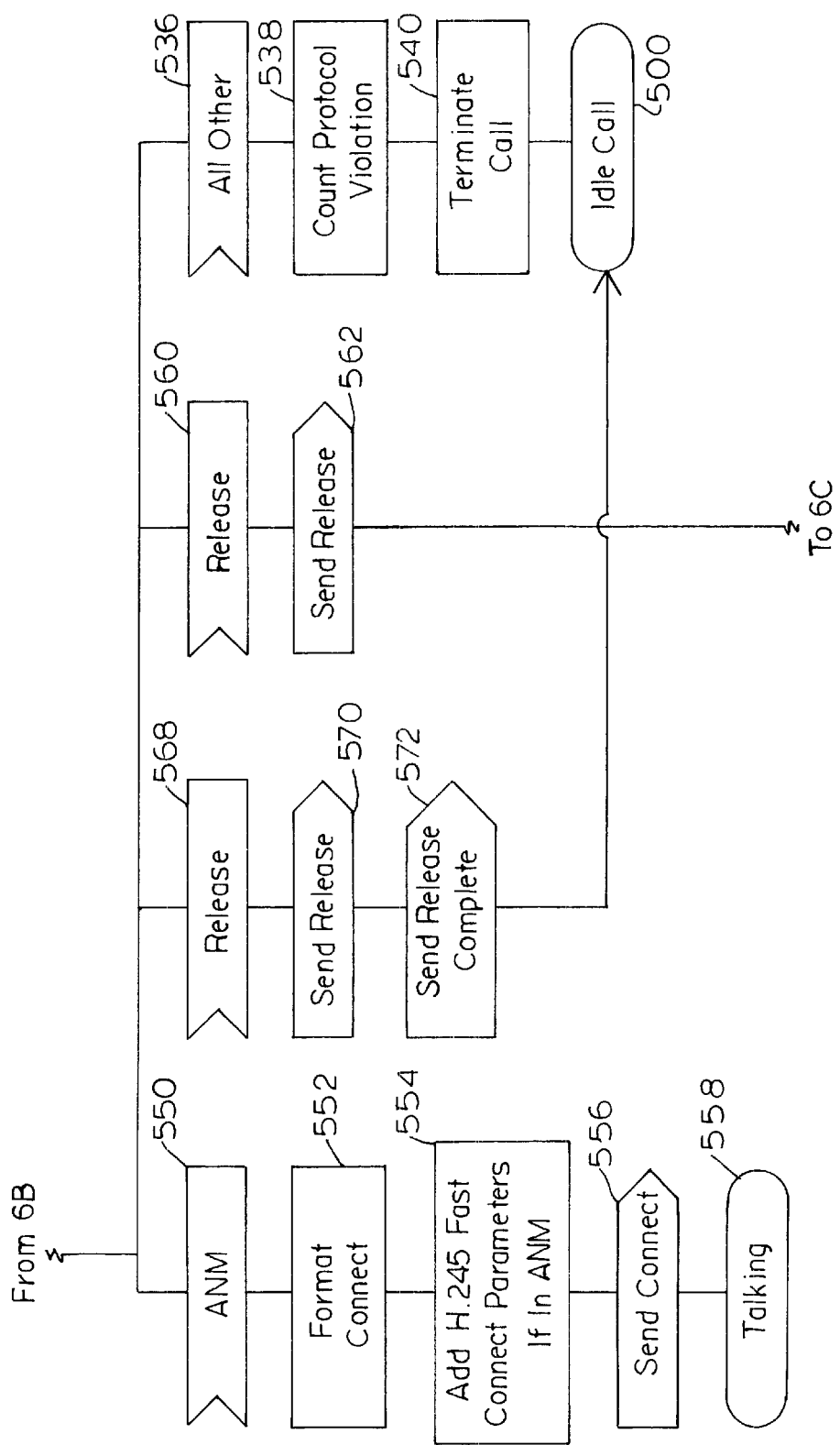

Referring specifically to FIG. 6B, if CO 82 receives ACM 520 from CO 80, CO 82 is going to format an alerting message 542. If the ACM contains the H.245 fast connect parameters of computer 72, CO 82 will add H.245 fast connect parameters of computer 72 to the alerting message 544. This alerting message is sent 546 to H.323 terminal device 84. The program then proceeds to the origination alerting stage 548. If the call attempt is successful at this point, CO 80 will send an answer message (ANM) 550 to CO 82 as shown in FIG. 6D. CO 82 will format a connect message 552. The ANM may contain the fast connect parameters of computer 72. If so, CO 82 adds H.245 fast connect parameters 554 of computer 72 to the connect message. The connect message is sent to H.323 terminal device 84 to establish the call 556 and 558, respectively.

Still referring to FIG. 6B, if the call is not proceeding correctly after the origination alerting stage 548, User1 may terminate the call by requesting CO 80 to send a release message 560 to CO 82 (FIG. 6D). CO 82 then sends a release message 562 to H.323 terminal device 84. The call will then proceed to a release pending state 564, as shown in FIG. 6C. After release pending state 564, CO 82 will receive a release complete message 566 and the program will return to an idle call state 500. Now referring back FIG. 6D, if User2 wishes to terminate the call, User 2 may request H.323 terminal device 84 to send a release message 568 to CO 82. CO 82 then sends a release message 570 to CO 80 and a release complete message 572 to H.323 terminal device 84, whereby via the program User1 and User2 telecommunications infrastructures returns to an idle call state 500. In all other unsuccessful call attempts 536, the program would count the protocol violation 538, terminate the call 540, and return to an idle call state 500.

Referring again to FIG. 6A, if User1 initiates a call to User2, CO 80 will send an INM 574 containing the address of computer 72 to CO 82. CO 82 will find and remove the address 576 of computer 72 from INM 574 and then build a setup message 578 with the H.245 fast connect parameters from INM 574. The setup message is sent 582 to H.323 terminal device 84. Once the timer is set 584, CO 82 will send an ACM 580 to CO 80. Next the call will enter a termination proceeding stage 582 (FIG. 6C). CO 82 will receive an alerting message 584 from H.323 terminal device 84. CO 82 also sends another ACM 586 back to CO 80. The program will then return to an alerting state 588. Connect message 590 is sent from H.323 terminal device 84 to CO 82. This connect message will contain the H.245 fast connect parameters of H.323 terminal device 84. CO 82 will format an ANM 592 and add the H.245 fast connect parameters 594 of H.323 terminal device 84 and then send the ANM 596 to CO 80 to complete the call 558.

Figure 6E:
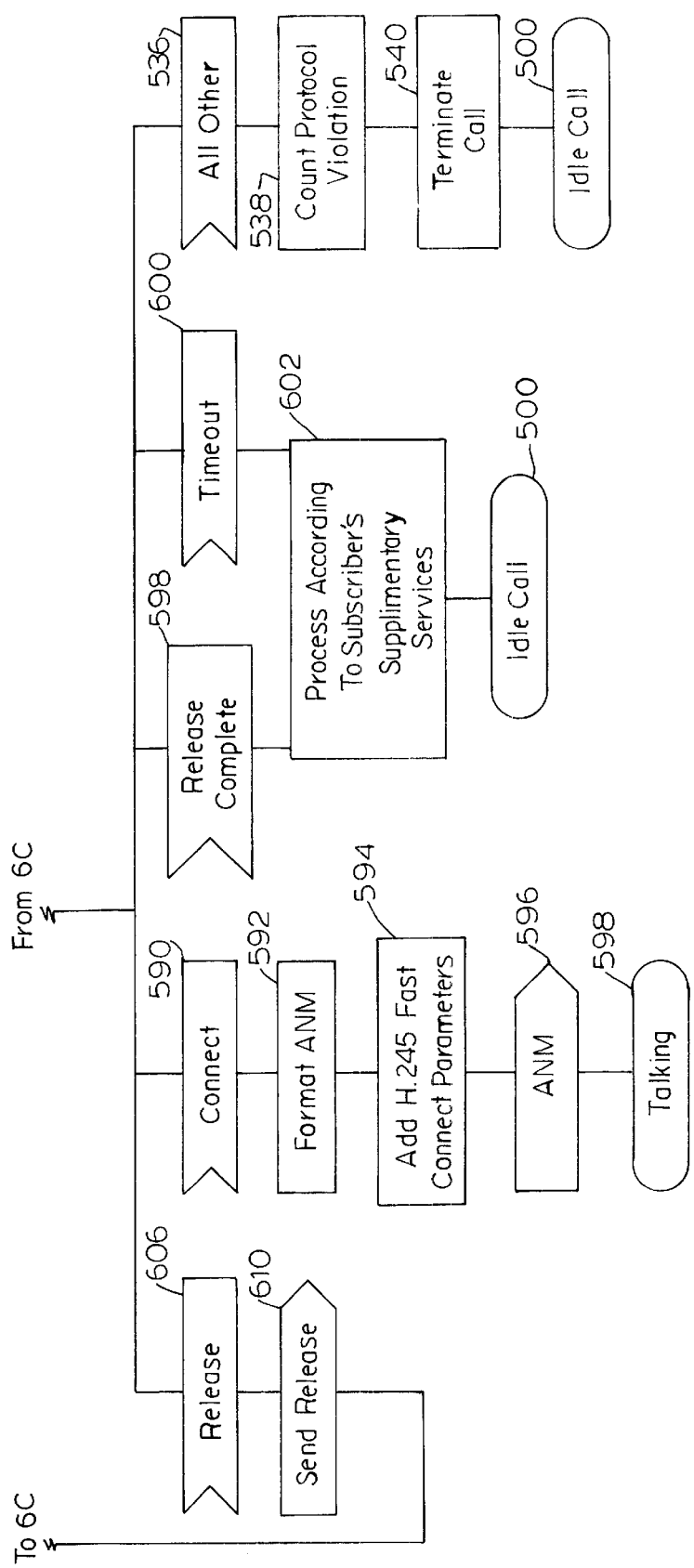

After alerting stage 588 (FIG. 6C), CO 82 might receive a release complete 598 or timeout message 600 and then proceed to process according to subscriber's supplementary services 602 before returning to idle call state 500, as shown in FIG. 6E. In other unsuccessful call attempts 536, the program would count the protocol violation 538 and terminate the call 540 to return to the idle call state 500. Alternatively, after the termination proceeding 582, CO 82 might receive a release complete 598 or timeout message 600 and then proceed to process according to subscriber's supplementary services 602 before returning to idle call state 500, as shown in FIG. 6C.

Referring now to FIG. 6C, after the termination proceeding 582 (FIG. 6C), CO 82 can receive release message 604 and send release 608. The program will then proceed to a release pending state 564, as shown in FIG. 6E. As shown in FIGS. 6C and 6E, after the alerting stage of the call 588, CO 82 could receive a release message 606 and send a release 610 and proceed to release pending state 564. After the release pending state 564, CO 82 could receive a release complete message 566 and then return to the idle call state 500, as shown in FIG. 6C.

Figure 7:
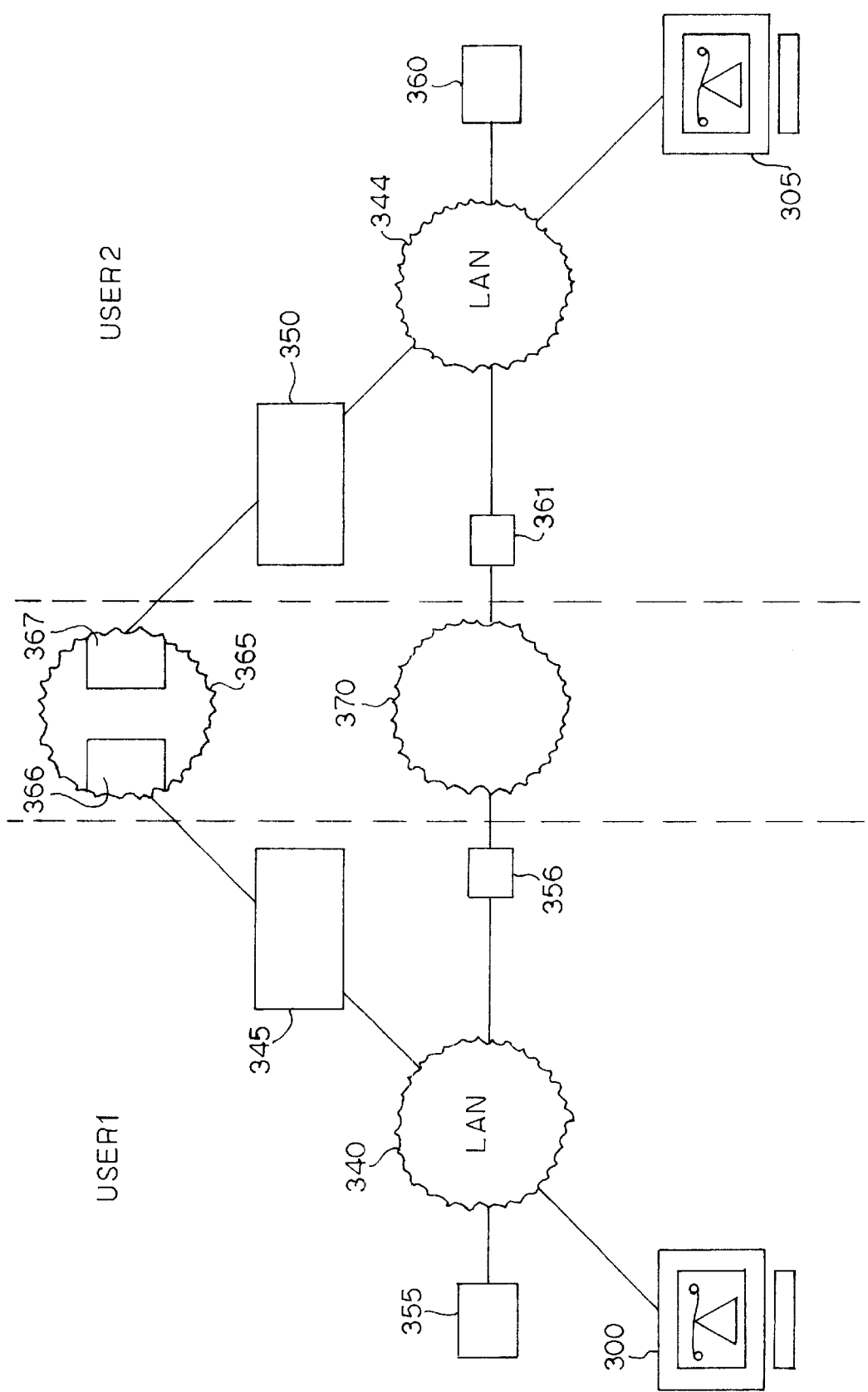
FIG. 7 is a diagram of a telecommunications network environment in accordance with a third embodiment of the invention.

FIG. 7 shows a third embodiment of the invention. User1 and User2 have H.323 terminal devices 300 and 305, respectively, connected to separate LANs 340 and 344, respectively. User1 and User2 have Gateways 345 and 350 connected to their respective LANs 340 and 344. Both Gateways 345 and 350 are also connected to a PSTN 365 via CO 366 and 367, respectively. Gatekeepers 355 and 360 are connected to LANs 340 and 344, respectively. User1 and User2 have firewalls 356 and 361 to limit access to their respective LANs 340 and 344 from public data network 370. Gateways 345 and 350 convert packet data to traditional time division multiplexing (TDM) and vice versa. For example, Gateway 345 receives packet data from H.323 terminal device 300 via LAN 340. Gateway 345 converts this packet data to TDM so that it can be sent across PSTN 365 to Gateway 350. Gateway 350 converts the TDM back to packet data and transfers the packet data to H.323 terminal device 305 via LAN 344. Gatekeepers 355 and 360 authenticate telephone calls of User1 and User2, respectively. For example, the Gatekeepers 355 and 360 track each call of their respective user for billing purposes as well as performing other supplementary services. CO 366 and 367 handles the voice transfers to and from User1 and User2 through PSTN 365. Alternatively, instead of using H.323 terminal devices 300 and 305, it is appreciated that User1 and User2 may each have a separate phone and computer directly interfaced to their respective LANs 340 and 344.

Figure 8:
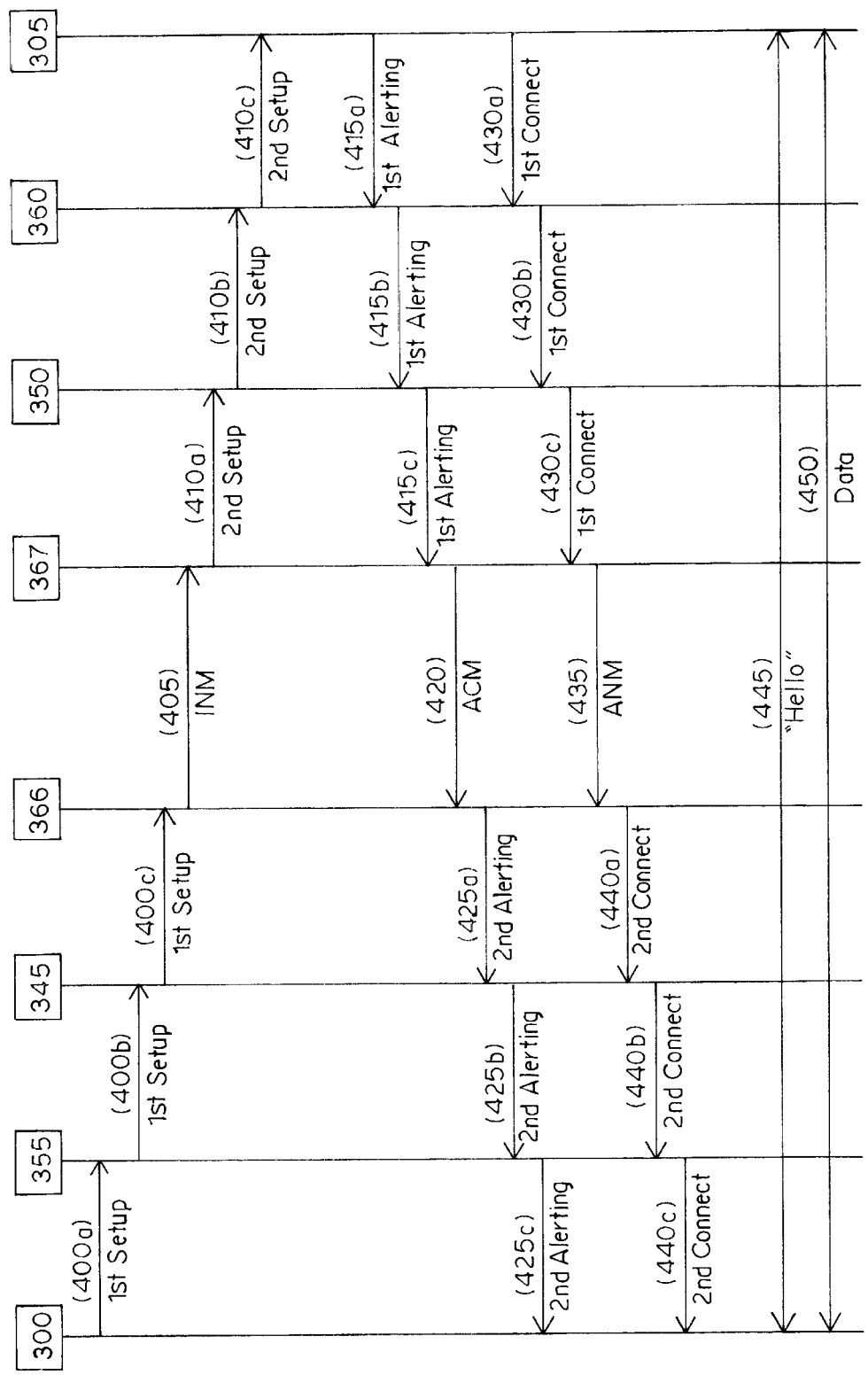
FIG. 8 is a call flow diagram of a third embodiment of the invention.

FIG. 8 illustrates the sequence of messages sent between User1 and User2 during the establishment of a multimedia communication session in accordance with the third embodiment. By way of example, User1 initiates a telephone call to User2 through H.323 terminal device 300. First setup messages 400*a,* 400*b* and 400*c* are sent to CO 366 via Gatekeeper 355 and Gateway 345. First setup messages 400*a,* 400*b,* and 400*c* are also collectively referred to herein as first setup message 400. First setup message 400 contains H.323 terminal device 300 computer address and other information to establish call. CO 366 inserts the information contained in first setup message 400 into an initial message (INM) 405, including H.323 terminal device 300 computer address. CO 366 transmits INM 405 through PSTN 365 (not shown) to CO 367. After INM 405 arrives at CO 367, the relevant information of User1 first setup message 400 is transferred from INM 405 to second setup message 410*a*. Second setup message 410*a* is transferred to Gateway 350, which in turn transmits second setup message 410*b* to Gatekeeper 360. Gatekeeper 360 then transmits setup message 410*c* to H.323 terminal device 305. Second setup messages 410*a,* 410*b,* and 410*c* are also collectively referred to herein as second setup message 410.

Once User2 H.323 terminal device 305 receives second setup massage 410, it sends first alerting messages 415*a,* 415*b* and 415*c* cascading to CO 367 via Gatekeeper 360, and Gateway 350. First alerting messages 415*a,* 415*b,* and 415*c* are also collectively referred to herein as first alerting message 415. CO 367 removes the relevant information from first alerting message 415, including H.323 terminal device 305 computer address, and inserts it into address complete message (ACM) 420. CO 367 sends ACM 420 to CO 366. CO 366 then transfers the relevant information from the ACM 420 to a second alerting message 425*a*. CO 366 sends second alerting messages 425*a,* 425*b,* and 425*c* cascading to H.323 terminal device 300 through Gateway 345, Gatekeeper 355. Second alerting messages 425*a,* 425*b,* and 425*c* are also collectively referred to herein as second alerting message 425. User2, via H.323 terminal device 305, sends first connect message 430*a,* 430*b* and 430*c* cascading to CO 367 via Gatekeeper 360 and Gateway 350. First connect messages 430*a,* 430*b,* and 430*c* are also collectively referred to herein as first connect message 430. First connect message 430 contains H.323 terminal device 305 computer address and other necessary connect information. CO 367 transfers the relevant information from first connect message 430 and insert the information into answer message (ANM) 435. ANM 435 is then transferred across PSTN 365 (not shown) to CO 366. CO 366 removes the relevant information from ANM 435 and inserts this information into second connect messages 440*a,* 440*b* and 440*c* which are sent to H.323 terminal device 300 via Gateway 345 and Gatekeeper 355. Voice and data connections 445 and 450, respectively, are now established between H.323 terminal devices 300 and 305.

Alternatively, instead of sending User2 H.323 terminal device 305 computer address to User1 H.323 terminal device 300 via first alerting message 415, ACM 420 and second alerting message 425; User2 H.323 terminal device computer 305 address may be sent to User1 H.323 terminal device 300 via first connect message 430, ANM 435 and second connect message 440.

I have described specific embodiments of my invention which provides a way in which multimedia communications can be integrated into a single call using a PSTN. One of ordinary skill in the art will quickly recognize that the invention has other applications in other environments. In fact, many embodiments and implementations are possible. The following claims are in no way intended to limit the scope of the invention to the specific embodiments described.

What is claimed is:

1. A method of establishing, through a PSTN, a multimedia communications session between first and second telecommunications infrastructures, each of said infrastructures located on separate private data networks comprising a means to automatically establish an integrated voice and data session initiated by a single telephone call using the PSTN, the method comprising the steps of:

(a) initiating the telephone call from said first telecommunications infrastructure to said second telecommunications infrastructure; and
    (b) in response to initiating the telephone call:
        i. retrieving a first computer address of said first telecommunications infrastucture;
        ii. building a first message containing said first computer address of said first telecommunications infrastructure;
        iii. sending said first message from said first telecommunications infrastructure to said second telecommunications infrastructure via the PSTN;
        iv. retrieving a second computer address of said second telecommunications infrastructure;
        v. building a second message containing said second computer address of said second telecommunications infrastructure;
        vi. sending said second message from said second telecommunications infrastructure to said first telecommunications infrastructure via the PSTN; and
        vii. establishing said multimedia communications session between said first and second telecommunications infrastructures.

2. The method of claim 1 further comprising of the step of sending a ring notification message while said multimedia communication session is being established.

3. The method of claim 2 further comprising the step of sending a call proceeding release notification message while said multimedia communications session is being established.

4. The method of claim 1 further comprising the step of receiving an initial message.

5. The method of claim 1 wherein the step of retrieving said first computer address further comprises the step of allowing a telephony server to retrieve said first computer address.

6. The method of claim 1 wherein the step of retrieving said first computer address further comprises the step of retrieving said first computer address using a LDAP protocol.

7. The method of claim 1 wherein the step of retrieving said first computer address further comprises the step of retrieving said first computer address using an X.500 protocol.

8. A communications system for establishing, through a PSTN, a multimedia communications session between first and second telecommunications infrastructures, each of said infrastructures located on separate private data networks comprising a means to automatically establish an integrated voice and data session initiated by a single telephone call using the PSTN, said system comprising:

(a) a means for initiating the telephone call from said first telecommunications infrastructure to said second telecommunications infrastructure;
    (b) a means for retrieving a first computer address of said first telecommunications infrastructure in response to initiating the telephone call;
    (c) a means for building a first message containing said first computer address of said first telecommunications infrastructure;

(d) a means for sending said first message from said first telecommunications infrastructure to said second telecommunications infrastructure via the PSTN;

(e) a means for retrieving a second computer address of said second telecommunications infrastructure;

(f) a means for building a second message containing said second computer address of said second telecommunications infrastructure;

(g) a means for sending said second message from said second telecommunications infrastructure to said first telecommunications infrastructure via the PSTN; and (h) a means for establishing said multimedia communications session between said first and second telecommunications infrastructures.

9. The communications system of claim 8 wherein said means for initiating a telephone call comprises a telephone.

10. The communications system of claim 8 wherein said means for initiating a telephone call comprises a H.323 terminal device.

11. The communications system of claim 10 wherein said means for retrieving said first or second computer address is a telephony server.

12. The communications system of claim 10 wherein said means for retrieving said first or second computer address is a Gateway.

13. The communications system of claim 10 wherein said means for building a first or second message is a central office.

14. The communications system of claim 10 wherein said means for sending said first and second messages to said first and second telecommunications infrastructures, respectively, is said PSTN.

15. A method of establishing, through a PSTN, a multimedia communications session between first and second telecommunications infrastructures, each of said infrastructures located on separate private data networks comprising a means to automatically establish an integrated voice and data session initiated by a single telephone call using the PSTN, the method comprising the steps of:

(a) initiating the telephone call from said first telecommunications infrastructure to said second telecommunications infrastructure; and (b) in response to initiating the telephone call:

i. retrieving a first computer address of said first telecommunications infrastructure;

ii. building an initial message (INM) containing said first computer address of said first telecommunications infrastructure;

iii. sending said INM from said first telecommunications infrastructure to said second telecommunications infrastructure via the PSTN;

iv. retrieving a second computer address of said second telecommunications infrastructure;

v. building an address complete message (ACM) containing said second computer address of said second telecommunications infrastructure;

vi. sending said ACM from said second telecommunications infrastructure to said first telecommunications infrastructure via the PSTN; and vii. establishing said multimedia communications session between said first and second telecommunications infrastructures.

16. The method of claim 15 further comprising of the step of sending a ring notification message.

17. The method of claim 15 further comprising the steps of retrieving said first computer address from said INM, and sending said first computer address to said second telecommunications infrastructure.

18. The method of claim 17 further comprising the steps of retrieving said second computer address from said ACM, and sending said second computer address to said first telecommunications infrastructure.

19. The method of claim 15 further comprising of the steps of building an answer message (ANM), and sending said ANM from said second telecommunications infrastructure to said first telecommunications infrastructure.

20. The method of claim 19 further comprising of the steps of building a server-notify message (SNM), and requesting a first central office to send said SNM to a telephony server.

21. The method of claim 20 further comprising the step of requesting said telephony server to send a computer address message (CAM) to said central office.

22. The method of claim 21 further comprising the step of sending a call proceeding message to said first telecommunications infrastructure.

23. A method of establishing, through a PSTN, a multimedia communications session between first and second telecommunications infrastructures, each of said infrastructures located on separate private data networks comprising a means to automatically establish an integrated voice and data session initiated by a single telephone call using the PSTN, the method comprising the steps of:

(a) initiating the telephone call from said first telecommunications infrastructure to said second telecommunications infrastructure; and (b) in response to initiating the telephone call:

i. retrieving a first computer address of said first telecommunications infrastructure;

ii. building an initial message (INM) containing said first computer address of said first telecommunications infrastructure;

iii. sending said INM from said first telecommunications infrastructure to said second telecommunications infrastructure via the PSTN;

iv. retrieving a second computer address of said second telecommunications infrastructure;

v. building an answer message (ANM) containing said computer address of said second telecommunications infrastructure;

vi. sending said ANM from said second telecommunications infrastructure to said first telecommunications infrastructure via the PSTN; and vii. establishing said multimedia communications session between said first and second telecommunications infrastructures.

24. The method of claim 23 further comprising the step of sending a call proceeding message.

25. The method of claim 23 further comprising of the step of sending a ring notification message.

26. The method of claim 23 further comprising of the steps of building an address complete message (ACM), and sending said ACM from said second telecommunications infrastructure to said first telecommunications infrastructure.

27. The method of claim 23 further comprising of the steps of building a server-notify message (SNM), and requesting a first central office to send said SNM to a telephony server.

28. The method of claim 27 further comprising the step of requesting said telephony server to send a computer address (CAM) to said central office.

29. The method of claim 26 further comprising the steps of retrieving said first computer address from said INM, and sending said first computer address to said second telecommunications infrastructure.

30. The method of claim 29 further comprising the steps of retrieving said second computer address from said ACM, and sending said second computer address to said first telecommunications infrastructure.

31. A computer program product for establishing, through a PSTN, a multimedia communications session between first and second telecommunications infrastructures, each of said infrastructures located on separate private data networks comprising a means to automatically establish an integrated voice and data session initiated by a single telephone call using the PSTN, the computer program product having a medium with a computer program embodied thereon, the computer program comprising:
   (a) computer product code for initiating the telephone call from said first telecommunications infrastructure to said second telecommunications infrastructure;
   (b) computer product code for retrieving a first computer address of said first telecommunications infrastructure in response to initiating the telephone call;
   (c) computer product code for building an initial message (INM) containing said computer address of said first telecommunications infrastructure;
   (d) computer product code for sending said INM from said first telecommunications infrastructure to said second telecommunications infrastructure via the PSTN;
   (e) computer product code for retrieving a second computer address of said second telecommunications infrastructure;
   (f) computer product code for building an answer message (ANM) containing said second computer address of said second telecommunications infrastructure;
   (g) computer product code for sending said ANM from said second telecommunications infrastructure to said first telecommunications infrastucture via the PSTN; and
   (h) computer product code for establishing between said first and second telecommunications infrastructures said multimedia communications session.

32. The computer product program according to claim 31 wherein the computer product program further comprises computer product code for building an address complete message (ACM), and computer product code for sending said ACM from said second telecommunications infrastructure to said first telecommunications infrastructure.

33. The computer product program according to claim 32 wherein the computer product program further comprises computer product code for building a server notify message (SNM); and computer product code for requesting a first central office to send said SNM to a telephony server.

34. The computer product program according to claim 33 wherein the computer product program further comprises computer. product code for requesting said telephony server to send a computer address (CAM) to said central office.

35. The computer product program according to claim 34 wherein the computer product program further comprises computer product code for sending a call proceeding message.

36. A method of automatically establishing an integrated voice and data session between first and send telecommunications infrastructures, by initiating a single telephone call through a PSTN, the method comprising the steps of:
   (a) initiating the telephone call between said first and second telecommunications infrastructures; and
   (b) in response to initiating the telephone call:
      i. initiating a data connection between said first and second telecommunications infrastructures via the PSTN;
      ii. combining voice and data connect information of said respective first and second telecommunications infrastructures;
      iii. sending said combined voice and data connect information between said first and second telecommunications infrastructures via the PSTN; and
      iv. establishing between said first and second telecommunications infrastructures said integrated voice and data session.

37. A method of automatically establishing a multimedia communication session between first and second telecommunications infrastructures through a PST, the method comprising the steps of:
   (a) initiating a voice session between said first and second telecommunications infrastructures; and
   (b) in response to initiating a telephone call:
      i. initiating a data communications session between said first and second telecommunications infrastructures via the PSTN;
      ii. combining connect information of said voice session and said data session of said respective first and second telecommunications infrastructures;
      iii. sending said combined connect information between said first and second telecommunications infrastructures via the PSTN; and
      iv. establishing said multimedia communications session between said first and second telecommunications infrastructures.

38. A method of establishing, through a PSTN, a multimedia communications session between first and second telecommunications infrastructures, each of said infrastructures located on separate private data networks comprising a means to automatically establish an integrated voice and data session initiated by a single telephone call using the PSTN, the method comprising the steps of:
   (a) generating a first message to initiate the telephone call from said first telecommunications infrastructure to said second telecommunication infrastructure; and
   (b) in response to initiating the telephone call:
      i. retrieving a first telecommunications computer address;
      ii. combining said first telecommunications computer address with said first message to form a second message;
      iii. sending said second message through said PSTN to said second telecommunications infrastructure;
      iv. generating a third message from said second telecommunications infrastructure in response to said second message;
      v. retrieving said second telecommunications infrastructure computer address;
      vi. combining said second telecommunications infrastructure computer address with said third message to form a fourth message;
      vii. sending said fourth message through said PSTN to said first telecommunications infrastructure; and
      viii. establishing said multimedia communications session between said first and second telecommunications infrastructures.

39. A computer program product for establishing an integrated voice and data session between first and second telecommunications infrastructures, the computer program product having a medium with a computer program embodied thereon, the computer program comprising:

(a) computer program code for initiating a telephone call between said first and second telecommunications infrastructures;

(b) computer program code for initiating a data connection between said first and second telecommunications infrastructures via the PSTN in response to initiating the telephone call;

(c) computer program code for combining voice and data connect information of said respective first and second telecommunications infrastructures;

(d) computer program code for sending said combined voice and data connect information between said first and second telecommunications infrastructures via the PSTN; and (e) computer program code for establishing between said first and second telecommunications infrastructures said integrated voice and data session.

40. Apparatus for establishing an integrated voice and data session between first and second telecommunications infrastructures, the apparatus comprising:

(a) means for initiating a telephone call between said first and second telecommunications infrastructures;

(b) means for initiating a data connection between said first and second telecommunications infrastructures via the PSTN in response to initiating the telephone call;

(c) means for combining voice and data connect information of said respective first and second telecommunications infrastructures;

(d) means for sending said combined voice and data connect information between said first and second telecommunications infrastructures via the PSTN; and (e) means for establishing between said first and second telecommunications infrastructures said integrated voice and data session.

* * * * *